United States Patent
Yawata et al.

(10) Patent No.: US 8,904,930 B2
(45) Date of Patent: Dec. 9, 2014

(54) FLEXOGRAPHIC PRINTING ORIGINAL PLATE CAPABLE OF BEING LASER-ENGRAVED

(75) Inventors: Yukimi Yawata, Okayama (JP); Kazuya Yoshimoto, Okayama (JP); Toru Wada, Okayama (JE)

(73) Assignee: Toyo Boseki Kabushiki Kaisha, Osaka (JP)

( * ) Notice: Subject to any disclaimer, the term of this patent is extended or adjusted under 35 U.S.C. 154(b) by 680 days.

(21) Appl. No.: 12/999,126

(22) PCT Filed: Jun. 9, 2009

(86) PCT No.: PCT/JP2009/002589
§ 371 (c)(1),
(2), (4) Date: Dec. 15, 2010

(87) PCT Pub. No.: WO2009/153932
PCT Pub. Date: Dec. 23, 2009

(65) Prior Publication Data
US 2011/0083571 A1     Apr. 14, 2011

(30) Foreign Application Priority Data
Jun. 18, 2008   (JP) .................................. 2008-159163

(51) Int. Cl.
*B41N 1/12* (2006.01)
*C08F 2/48* (2006.01)
*B41C 1/05* (2006.01)

(52) U.S. Cl.
CPC ... *C08F 2/48* (2013.01); *B41C 1/05* (2013.01); *B41N 1/12* (2013.01)
USPC .......................... 101/395; 101/401.1; 430/306

(58) Field of Classification Search
USPC ................. 101/395, 401.1; 430/270.1, 280.1, 430/286.1, 287.1
See application file for complete search history.

(56) References Cited

U.S. PATENT DOCUMENTS

| 6,127,094 | A | * | 10/2000 | Victor et al. | 430/284.1 |
| 2007/0084369 | A1 | * | 4/2007 | Kodama et al. | 101/401.1 |
| 2007/0117039 | A1 | * | 5/2007 | Wada et al. | 430/270.1 |

FOREIGN PATENT DOCUMENTS

| JP | 2005-254696 | 9/2005 |
| JP | 2006-1168 | 1/2006 |
| JP | 2008-105429 | 5/2008 |
| WO | 93/23252 | 11/1993 |
| WO | 02/076739 | 10/2002 |
| WO | 2008/075451 | 6/2008 |

* cited by examiner

*Primary Examiner* — Joshua D Zimmerman
(74) *Attorney, Agent, or Firm* — Fish & Richardson P.C.

(57) ABSTRACT

The present disclosure describes a printing original plate capable of being laser-engraved such that printing deficiency caused by residues is avoided, and such that resolution and printing quality are good.

A flexographic printing original plate capable of being laser-engraved which is obtained by subjecting a photosensitive resin composition containing (A) at least one latex having a weight-average degree of gelation of 40% or more, (B) photopolymerizable compound and (C) photopolymerization initiator to irradiation to light followed by cross-linking and curing. The photopolymerizable component (B) contains the photopolymerizable oligomer and the ethylenic unsaturated monomer in 10 to 25% by weight and 5 to 40% by weight, respectively, to the weight of the photosensitive resin composition and the ethylenic unsaturated monomer comprises 75 to 5% by weight of monofunctional monomer and 25 to 95% by weight of trifunctional monomer.

7 Claims, No Drawings

FLEXOGRAPHIC PRINTING ORIGINAL PLATE CAPABLE OF BEING LASER-ENGRAVED

TECHNICAL FIELD OF THE INVENTION

The present invention relates to a flexographic printing original plate capable of being laser-engraved for the manufacture of a printing plate where no printing deficiency is resulted, resolution is good and printing property is also good.

BACKGROUND ART

As a method for the manufacture of flexographic printing plate, there has been used a plate-making process (negative system) where a film of original image is placed on a photosensitive resin layer, the resin of the exposed area is cross-linked by exposing to light and the non-cross-linked resin in the non-exposed area is washed and removed by a developer. Recently however, a method where the information treated on a computer is directly output onto a printing plate to give an uneven pattern which is to be a relief (CTP system) has been diffusing. Particularly, a laser engraving system where engraving is conducted by laser does not need the film of original image and the developing step whereby it is very efficient and environment-friendly method (cf. Patent Document 1) and has been investigated for its practical application.

In a step for the manufacture of printing plate by laser engraving, laser beam is irradiated on a printing original plate based on the image data so that the irradiated area is decomposed and removed whereby unevenness is resulted on the surface of the plate. At that time, residues are formed by the decomposition of the image forming material at the laser irradiated area and a part of them are scattered on the whole printing plate. If the residues are made to leave on the printing plate, some problems are resulted and, therefore, they are removed from the printing plate by sucking them during the laser irradiation with a dust collector installed near the laser apparatus and/or by washing the printing plate after the laser irradiation.

However, since synthetic rubber is a main component in the above printing original plate, tackiness of the plate itself is high, the residues generated by laser irradiation are not able to be removed even by means of suction during the laser irradiation and by washing thereafter whereby there is a problem that they are apt to remain by adhering to the plate. When the residues remain by adhering to the non-irradiated area (convex area) of the printing plate, that results in printing deficiency since ink is applied to such an area during the printing. Moreover, when the residues remain by adhering to the bottom of the irradiated area (concave area) of the printing plate, depth of a screen dot lowers while, when they remain by adhering to the side of the concave area, reproducibility of the screen dot lowers. Any of them may cause the lowering of the resolution.

As a method for overcoming the above disadvantages, there has been proposed an art where a colorless and transparent filler such as fine powder of silica is compounded with the resin composition so as to enhance the mechanical characteristics of the printing original plate and, as a result, the tackiness is lowered (cf. Patent Document 2). However, in a method where a filler such as fine powder of silica is compounded, a lot of the filler is needed for a sufficient lowering of the tackiness of the printing original plate and there is a problem that molding property of the printing original plate and physical property of the plate are significantly deteriorated. As such, addition of a filler causes bad affection on molding property of the printing original plate and physical property of the plate and, therefore, there has been a demand for developing a method by which tackiness of the printing original plate is lowered without addition of the filler.

As a method therefor, the present inventors have already proposed a method where latex is used as a main component for the photosensitive resin composition whereby a flexographic printing plate which results in no printing deficiency and has good resolution is able to be manufactured (cf. Patent Document 3). In the above patent, there is proposed a printing plate giving less residues where a hydrophobic polymer produced from at least two kinds of water-dispersed latexes is made to contain in a printing original plate whereby the ability of forming the image of 150 lpi is achieved.

Recently however, far more highly fine ones have been demanded for printed things and, even in the flexography, there is a need of the printing performance of as far high as 175 lpi as compared with the conventional 150 lpi. To be more specific, the 1% screen dot diameter in 150 lpi is 18.8 μl while that in 175 lpi becomes as fine as 16.1 μm. When such a highly fine printing is to be made possible, an observation under a microscopic has been applied for confirming the image forming property and, in the conventional methods, prevention of printing deficiency due to residues has not been sufficient.

PRIOR ART DOCUMENTS

Patent Documents

Patent Document 1: Japanese Patent Application Laid-Open (JP-A) No. 506780/95
Patent Document 2: Japanese Patent Application Laid-Open (JP-A) No. 2004-533343
Patent Document 3: Japanese Patent Application Laid-Open (JP-A) No. 2006-001168

DISCLOSURE OF THE INVENTION

Problem that the Invention is to Solve

The present invention has been created in view of the current status of the prior art as mentioned above and its object is to provide a printing original plate capable of being laser-engraved in which printing deficiency caused by residues is not resulted, resolution is good and printing property is also good.

Means for Solving the Problem

The present inventors have carried out intensive investigations for achieving such an object and, as a result, they have found that, when the ratio by weight of photopolymerizable oligomer and ethylenic unsaturated monomer in the photopolymerizable compound are appropriately set and, further, monofunctional monomer and trifunctional monomer are used in an appropriate ratio by weight as the ethylenic unsaturated monomer in a photosensitive resin composition using latex as a main component, it is now possible to provide a printing plate where generation of the residues by laser irradiation and adhesion thereof to the printing plate are able to reduced and, further, the printing property is good whereupon the present invention has been achieved.

Thus, the present invention relates to a flexographic printing original plate capable of being laser-engraved which is obtained by subjecting a photosensitive resin composition containing (A) at least one latex having a weight-average degree of gelation of 40% or more, (B) photopolymerizable component and (C) photopolymerization initiator to irradiation to light followed by cross-linking and curing, wherein the photopolymerizable component (B) contains the photopolymerizable oligomer and the ethylenic unsaturated monomer in 10 to 25% by weight and 5 to 40% by weight, respectively, to the weight of the photosensitive resin composition and the ethylenic unsaturated monomer comprises 75 to 5% by weight of monofunctional monomer and 25 to 95% by weight of trifunctional monomer.

In a preferred embodiment of the flexographic printing original plate according to the present invention, the photopolymerizable oligomer has the same skeleton structure as the latex (A) and has a number-average molecular weight of 500 to 8000.

Advantages of the Invention

Since the printing original plate of the present invention uses monofunctional and trifunctional ethylenic unsaturated monomers in an appropriate ratio by weight as the components of the printing original plate as mentioned above, cross-linking density and flexibility of the plate are excellent. Therefore, adhesion and fusion of the residues resulted by the laser irradiation upon the manufacture of the printing plate are able to be suppressed. Accordingly, when the printing original plate of the present invention is used, a printing plate where adhesion of the residues is little is able to be provided, printing deficiency due to the above is not resulted and a printing plate with excellent resolution is able to be manufactured. In addition, since the resulting printing plate has an appropriate hardness, it exhibits good ink transfer and printing durability.

BEST MODE FOR CARRYING OUT THE INVENTION

The printing original plate of the present invention is used as a printing original plate suitable for the formation of relief images for flexographic printing with laser engraving, the formation of patterns for surface treatment such as embossing, and the formation of relief images for printing on tile, etc., and which can be obtained by subjecting a photosensitive resin composition containing (A) at least one latex having a weight average degree of gelation of 40% or more, (B) photopolymerizable compound and (C) photopolymerization initiator to irradiation to light followed by cross-linking and curing.

The latex (A) which constitutes the photosensitive resin composition of the present invention is the major component of an image forming material and has a role to be decomposed by imagewise-laser irradiation in a printing original plate, thereby forming a concave area. The present invention is characterized particularly by using, as a latex, at least one latex having a weight average degree of gelation of 40% or more. In the use of a latex less than 40% weight average degree of gelation, even if it exerts low tackiness when it is in the form of a resin composition, the tackiness will increase when it is processed into a printing original plate. The reason for this is that heating, pressurization or addition of a solvent upon molding the resin composition into a printing original plate makes latex microparticles fuse or aggregate to cluster or unite, so that the latex microparticles become incapable of existing in the form of microparticles. Therefore, in order to prevent latex microparticles from aggregating and uniting upon molding into a printing original plate and to thereby keep the low degree of tackiness even in the printing original plate, it is necessary to use a latex of a hard crosslinked material with more than 40% weight average degree of gelation. Here, a latex is an emulsion in which a macromolecule such as a natural rubber, a synthetic rubber or a plastic is dispersed in the form of colloid in water through the action of an emulsifier, and it is classified, depending upon the type of production process, into (i) a natural rubber latex, which is a naturally occurring product due to vegetable metabolism, (ii) a synthetic rubber latex, which is synthesized by emulsion polymerization, and (iii) an artificial latex, which is prepared by emulsifying and dispersing a solid rubber in water. The latex (A) used in the present invention, however, includes only (ii) the synthetic rubber latex and (iii) the artificial latex and excludes (i) the natural rubber latex.

While the latex (A) used in the present invention may be composed of either a single kind of latex or a mixture of two or more kinds of latex, it is necessary that the weight average degree of gelation of the latex (A) be 40% or more. The weight average degree of gelation of the latex (A) is preferably 50% or more, and more preferably 60% or more. If the degree of gelation of the latex is less than the value shown above, latex microparticles cannot not be prevented sufficiently from aggregating or uniting upon molding into a printing original plate and, therefore, it may be impossible to keep the tackiness of the printing original plate low. Moreover, it may be impossible to secure a high resolution of a printing plate. On the other hand, there is no upper limit with the degree of gelation of the latex. The larger the degree of gelation is, the greater the effect of preventing latex microparticles from aggregating and uniting. Here, the value of the degree of gelation of a latex is defined by the insolubility in toluene. Specifically, the degree of gelation of a latex is determined by accurately weighing 3 g of a latex solution onto a PET film having a thickness of 100 μm, drying it at 100° C. for 1 hour, subsequently immersing the film in a toluene solution at 25° C. for 48 hours, then drying it at 110° C. for 2 hours, and calculating the amount in % by weight of the insoluble.

As the latex (A) to be used in the present invention, a latex having a degree of gelation at a certain level or higher may be selected appropriately from among conventional latices. For example, a polybutadiene latex, a styrene-butadiene copolymer latex, an acrylonitrile-butadiene copolymer latex, a methyl methacrylate-butadiene copolymer latex, etc. can be used. Further, these latices may have been modified with (meth)acrylate, carboxy, etc. Here, because a variety of synthetic or natural latices as gelled latices are on the market, a proper one may be selected from among them as a gelled latex.

Moreover, as a latex (A), an ungelled latex or a latex having a low degree of gelation may also be used so far as the weight average degree of gelation of the whole latex becomes 40% or more. An ungelled latex is used in view of the ink transfer to a water-based ink. An ungelled latex may be selected appropriately from among conventionally known latices. For example, a polybutadiene latex, a styrene-butadiene copolymer latex, an acrylonitrile-butadiene copolymer latex or the like can be used. In particular, it is preferable, from the aforesaid point of view, to use an acrylonitrile-butadiene copolymer latex.

The photopolymerizable component (B) which constitutes the resin composition of the present invention has a role to polymerize and crosslink by light irradiation, thereby forming a dense network in a printing original plate for shape maintenance and physical property preservation. It is necessary that the photopolymerizable component (B) used in the present invention contains the photopolymerizable oligomer and the ethylenic unsaturated monomer in 10 to 25% by weight and 5 to 40% by weight, respectively, to the weight of the photosensitive resin composition. Preferably, the amount of the photopolymerizable oligomer and the ethylenic unsaturated monomer to the weight of the photosensitive resin composition are 13 to 22% by weight and 10 to 25% by weight, respectively. When the amount of the photopolymerizable polymer is more than the above upper limit, laser engraving property is poor while, when it is less than the above lower limit, printing durability as a printing plate is poor and that is not preferred. When the amount of the ethylenic unsaturated monomer is more than the above upper limit, the plate in a state of raw plate is too soft whereby handling is difficult and printing durability is poor while, when it is less than the above lower limit, laser engraving property is poor and that is no preferred.

It is preferred that the photopolymerizable oligomer of the present invention is a photopolymerizable oligomer where ethylenic unsaturated group is bonded to the terminal and/or the side chain of the conjugated diene type polymer. In view of improvement in compatibility and in repulsive elasticity, it is preferred that the photopolymerizable oligomer has the same skeleton structure as the latex (A). Number-average molecular weight of the photopolymerizable oligomer is preferably 500 to 8000, more preferably 1000 to 5000, and much more preferably 1500 to 4000. When the number-average molecular weight is less than the above lower limit, although the expansion coefficient after dipping in solvent for 24 hours is good, that is not preferred in view of compatibility with latex (A) and of too hard hardness. On the other hand, when the number-average molecular weight is more than the above upper limit, adhesion of the residues becomes too much.

The conjugated diene-based polymer which constitutes the photopolymerizable oligomer is formed of a homopolymer of a conjugated diene unsaturated compound or a copolymer of a conjugated diene unsaturated compound and a monoethylenically unsaturated compound. Examples of such a homopolymer of a conjugated diene unsaturated compound or a copolymer of a conjugated diene unsaturated compound and a monoethylenically unsaturated compound include a butadiene polymer, an isoprene polymer, a chloroprene polymer, a styrene-chloroprene copolymer, an acrylonitrile-butadiene copolymer, an acrylonitrile-isoprene copolymer, a methyl methacrylate-isoprene copolymer, a methyl methacrylate-chloroprene copolymer, a methyl acrylate-butadiene copolymer, a methyl acrylate-isoprene copolymer, a methyl acrylate-chloroprene copolymer, an acrylonitrile-butadiene-styrene copolymer and an acrylonitrile-chloroprene-styrene copolymer. Among these, a butadiene polymer, an isoprene polymer and an acrylonitrile-butadiene copolymer are preferable, and a butadiene polymer and an isoprene polymer are particularly preferable from the viewpoint of rubber elasticity and photocurability.

While the method for introducing an ethylenically unsaturated group into a terminal and/or a side chain of a conjugated diene-based polymer is not particularly restricted, the method may be, for example, (1) a method in which a monoethylenically unsaturated carboxylic acid such as (meth) acrylic acid is ester-linked through dehydration to a hydroxyl group at a terminal of a hydroxyl group-terminated conjugated diene-based polymer obtained by using hydrogen peroxide as a polymerization initiator or a alkyl monoethylenically unsaturated carboxylate, such as methyl (meth)acrylate and ethyl (meth)acrylate, is ester-linked through transesterification, or (2) a method in which an ethylenically unsaturated alcohol, such as allyl alcohol and vinyl alcohol, is caused to react with a conjugated diene-based polymer obtained by copolymerizing a conjugated diene compound and an ethylenically unsaturated compound containing an unsaturated carboxylic acid (ester) in at least apart thereof.

The ethylenic unsaturated monomer of the present invention is a compound which is able to be cross-linked by ultraviolet ray and comprises 75 to 5% by weight of a monofunctional monomer and 25 to 95% by weight of a trifunctional monomer. Preferably, the ratios by weight of the monofunctional monomer to the trifunctional monomer are 60 to 10% by weight and 40 to 90% by weight, respectively. The monofunctional monomer is compounded for enhancing the printing durability of the printing plate and the trifunctional monomer is compounded for making the cross-linking dense to enhance the laser engraving property. When there is the trifunctional monomer only, the printing plate becomes too hard and the printing durability is poor. When the monofunctional monomer is less than the above lower limit, printing durability is poor while, when it is more than the above upper limit, laser engraving property is poor.

Examples of the monofunctional ethylenic unsaturated monomer include alkyl (meth)acrylate such as methyl (meth) acrylate, ethyl (meth)acrylate, propyl (meth)acrylate, butyl (meth)acrylate, isoamyl (meth)acrylate, 2-ethylhexyl (meth) acrylate, lauryl (meth)acrylate or stearyl (meth)acrylate; cycloalkyl (meth)acrylate such as cyclohexyl (meth)acrylate; haloalkyl (meth)acrylate such as chloroethyl (meth)acrylate and chloropropyl (meth)acrylate; alkoxyalkyl (meth)acrylate such as methoxyethyl (meth)acrylate, ethoxyethyl (meth) acrylate or butoxyethyl (meth)acrylate; phenoxyalkyl (meth) acrylate such as phenoxyethyl acrylate or nonylphenoxyethyl (meth)acrylate; and alkoxyalkylene glycol (meth)acrylate such as ethoxydiethylene glycol (meth)acrylate, methoxytriethylene glycol (meth)acrylate or methoxydipropylene glycol (meth)acrylate. Among them, alkyl (meth)acrylate is preferred and lauryl (meth)acrylate and stearyl (meth)acrylate are particularly preferred.

Examples of the trifunctional ethylenic unsaturated monomer include trimethylolpropane tri(meth)acrylate, pentaerythritol tri(meth)acrylate, glycerol tri(meth)acrylate and triglycidyl ether tri(meth)acrylate of trimethylolpropane produced by an addition reaction of a compound having ethylenic unsaturated bond (such as unsaturated carboxylic acid or unsaturated alcohol) and active hydrogen to triglycidyl ether of polyhydric alcohol. Among them, trimethylolpropane tri (meth)acrylate is preferred.

The photopolymerization initiator (C) which constitutes the resin composition of the present invention has a role as a catalyst for photopolymerization and crosslinking reaction of the photopolymerizable component (B). While any compound capable of causing a polymerizable carbon-carbon unsaturated group to polymerize by light irradiation can be used as the photopolymerization initiator (C) used in the present invention, a compound which has a function of generating a radical through self decomposition or hydrogen extraction caused by light absorption is used preferably. Specifically, benzoin alkyl ethers, benzophenones, anthraquinones, benzyls, acetophenones, diacetyls and the like, for example, can be used.

The weight ratios of the latex (A), the photopolymerizable component (B) and the photopolymerization initiator (C) in the resin composition of the present invention are preferably 10 to 80:15 to 80:0.1 to 10, respectively.

If the weight ratio of the latex (A) is less than the lower limit shown above, the proportion of particles which fuse or aggregate at the time of molding into a printing original plate will become larger and the tackiness of a printing original plate may increase. Further, if the weight ratio of the latex (A) exceeds the upper limit shown above, the fluidity of the resin composition greatly deteriorates and it may become difficult to mold the resin composition into a printing original plate. Further, if the weight ratio of the photopolymerizable component (B) is less than the lower limit shown above, the curability of a printing original plate after photopolymerization may remarkably deteriorate or the mechanical properties of the printing original plate may remarkably deteriorate. Further, if the weight ratio of the photopolymerizable component (B) exceeds the upper limit shown above, the composition cannot keep a solid state and it may become difficult to mold the resin composition into a printing original plate. Further, if the weight ratio of the photopolymerization initiator (C) is less than the lower limit shown above, the curability of a printing original plate after photopolymerization may remarkably deteriorate or the mechanical properties of the printing original plate may remarkably deteriorate. Further, if the weight ratio of the photopolymerization initiator (C) exceeds the upper limit shown above, the curability in the thickness direction of a printing original plate may remarkably deteriorate and it may be difficult to cure the whole original plate.

In the resin composition of the present invention, optional components such as a hydrophillic polymer, a plasticizer and/or a polymerization inhibitor may be incorporated, if desired, in addition to the aforementioned three components (A) to (C).

The hydrophilic polymer has an effect of improving affinity between a printing plate and a water-based ink in flexographic printing using the printing plate produced and, thereby improving printing properties. Hydrophilic polymers which can be used in the resin composition of the present invention preferably include polymers having a hydrophilic group such as —COOH, —COOM (M is a monovalent, divalent or trivalent metal ion or a substituted or unsubstituted ammonium ion), —OH, —NH$_2$, —SO$_3$H and a phosphate group, and specifically include a polymer of (meth)acrylic acid or salts thereof, a copolymer of (meth)acrylic acid or salts thereof with an alkyl (meth)acrylate, a copolymer of (meth)acrylic acid or salts thereof with styrene, a copolymer of (meth)acrylic acid or salts thereof with vinyl acetate, a copolymer of (meth)acrylic acid or salts thereof with acrylonitrile, polyvinyl alcohol, carboxymethylcellulose, polyacrylamide, hydroxyethylcellulose, polyethylene oxide, polyethyleneimine, polyurethane which has a —COON group, polyurea urethane which has a —COOM group, polyamide acid which has a —COOM group, and salts or derivatives thereof. These may be used solely or two or more polymers may be used in combination. The incorporated proportion of the hydrophillic polymer in the resin composition of the present invention is preferably 20% by weight or less, and more preferably 15% by weight or less. If the incorporated amount of the hydrophilic polymer exceeds the upper limit shown above, a printing plate to be produced may deteriorate in water resistance and deteriorate in water-based ink resistance.

A plasticizer has an effect of improving the fluidity of a resin composition and an effect of adjusting the hardness of a printing original plate to be produced. The plasticizer capable of being used in the resin composition of the present invention is preferably a product which is good in compatibility with the latex (A), and more preferably a polyene compound which is liquid at room temperature or a compound having an ester linkage. Examples of the polyene compound which is liquid at room temperature are liquid polybutadiene, polyisoprene, and their maleinated derivatives and epoxidized derivatives resulting from modification of their terminal groups or side chains. Examples of the compound having an ester linkage include phthalates, phosphates, sebacates, adipates and polyesters having molecular weight of 1000 to 3000. The incorporated proportion of the plasticizer in the resin composition of the present invention is preferably 30% by weight or less, and more preferably 20% by weight or less. If the incorporated amount of the plasticizer exceeds the upper limit shown above, a printing plate may deteriorate greatly in mechanical properties and solvent resistance and may deteriorate printing durability.

The polymerization inhibitor has an effect of increasing the thermal stability of a resin composition. Polymerization inhibitors which can be used for the resin composition of the present invention may be conventionally known products, and examples thereof include phenols, hydroquinones and catechols. The incorporated proportion of the polymerization inhibitor in the resin composition of the present invention is preferably 0.001 to 3% by weight, and more preferably 0.001 to 2% by weight.

Moreover, a colorant, an antioxidant, etc. may also be added as optional components other than those mentioned above, unless the effect of the present invention is impaired.

The resin composition of the present invention is prepared by mixing the aforementioned three essential components (A) to (C) and, if desired, optional components. In this operation, an organic solvent such as toluene may be added, if desired, in order to make the mixing easier. Further, in order to mix completely, it is desirable to fully knead the components under a heating condition using a kneader. The heating condition is preferably about 50 to about 110° C. Further, the moisture contained in the organic solvent added at the time of mixing and in the components is preferably removed under reduced pressure after the kneading.

The printing original plate of the present invention is obtained by molding the resin composition of the present invention prepared as described above into a sheet-like or tubular form, and then irradiating the molded article with light to crosslink and cure.

A conventionally known resin molding method can be used as the method for molding the resin composition of the present invention into a sheet-like or tubular form. For example, a method can be mentioned which includes the application of the resin composition of the present invention onto an appropriate support or a cylinder of a printer, followed by pressurizing with a heat pressing machine, or the like. A material is preferably used which has flexibility and is excellent in dimension stability as the support. Examples thereof include a polyethylene terephthalate film, a polyethylene naphthalate film, a polybutylene terephthalate film and polycarbonate. In view of mechanical properties, stability in shape, etc. of a printing original plate, the thickness of the support is preferably 50 to 250 μm, and more preferably 100 to 200 μm. Further, if necessary, in order to improve the adhesion between the support and a resin layer, a known adhesive may be provided which has heretofore been used for this kind of purpose on the surface of the support. The condition of the pressurization is preferably about 20 to 200 kg/cm$^2$. The temperature condition in the pressurization is preferably about room temperature to about 150° C. While the thickness of a molded article to be formed may be determined appropriately according to the size, property and on the like of a printing original plate to be produced and is not specifically limited, it is ordinarily about 0.1 to about 10 mm.

The molded resin composition is subsequently irradiated with light, so that the photopolymerizable component (B) in the resin composition is polymerized and crosslinked and whereby the molded article is cured to form a printing original plate. Examples of the light source to be used for the curing include such as a high-pressure mercury lamp, an ultrahigh-pressure mercury lamp, an ultraviolet fluorescent lamp, a carbon-arc lamp and a xenon lamp. Also, the curing can be performed by any conventionally known method other than the above. While only a single type of light source may be used as the light source for the curing, the curability of the resin may increase when curing is performed by the use of two or more types of light sources which differ in wavelength. Therefore, two or more types of light sources may be used.

The printing original plate thus obtained is mounted on the surface of a plate-mounting drum of a laser engraving device. By imagewise-laser irradiation, an original plate of the irradiated portion is decomposed to form a concave area and a printing plate is produced. In the printing original plate obtained from the resin composition of the present invention, since tackiness has been reduced due to the use of a latex with a gelation degree at a certain level or higher, the residues produced by laser irradiation hardly adhere to the surface of a plate and therefore the printing deficiency and the decrease in resolution caused by the adhesion of the residue are inhibited effectively.

EXAMPLES

The present invention will now be further illustrated by way of the following Examples although the present invention is not limited thereto.

Example 1

20 parts by mass of methyl methacrylate-butadiene latex (NALSTER MR174 manufactured by Nippon A&L; degree of gelation: 95%; nonvolatile moiety: 50%) and 89 parts by mass of acrylonitrile-butadiene latex (CYATEX NA 20 manufactured by Nippon A&L; degree of gelation: 70%; nonvolatile moiety: 45%) as latex (A) components;

15 parts by mass of oligobutadiene acrylate (ABU-3 manufactured by Kyoeisha Kagaku; number-average molecular weight: ca. 2700), 10 parts by mass of lauryl methacrylate and parts by mass of trimethylolpropane triacrylate as photopolymerizable compounds (B);

1 part by mass of benzyl dimethylketal as a photopolymerization initiator (C) and others which were 20 parts by mass of PFT-3 (a compound of molecular weight of ca. 20,000 having a urethaneurea structure manufactured by Kyoeisha Kagaku; nonvolatile moiety: 25%) as a hydrophilic polymer, 0.1 part by mass of hydroquinone monomethyl ether as a polymerization inhibitor and 9 parts by mass of liquid butadiene rubber as a plasticizer were mixed in a container together with 5 parts by mass of toluene and kneaded at 105° C. using a pressurizing kneader and, after that, toluene and water were removed therefrom in vacuo to give a resin composition.

Example 2

20 parts by mass of methyl methacrylate-butadiene latex (NALSTER MR174 manufactured by Nippon A&L; degree of gelation: 95%; nonvolatile moiety: 50%) and 89 parts by mass of acrylonitrile-butadiene latex (CYATEX NA 20 manufactured by Nippon A&L; degree of gelation: 70%; nonvolatile moiety: 45%) as latex (A) components;

15 parts by mass of oligobutadiene acrylate (ABU-3 manufactured by Kyoeisha Kagaku; number-average molecular weight: ca. 2700), 7 parts by mass of lauryl methacrylate and parts by mass of trimethylolpropane triacrylate as photopolymerizable compounds (B);

1 part by mass of benzyl dimethylketal as a photopolymerization initiator (C) and others which were 20 parts by mass of PFT-3 (a compound of molecular weight of ca. 20,000 having a urethaneurea structure manufactured by Kyoeisha Kagaku; nonvolatile moiety: 25%) as a hydrophilic polymer, 0.1 part by mass of hydroquinone monomethyl ether as a polymerization inhibitor and 9 parts by mass of liquid butadiene rubber as a plasticizer were mixed in a container together with 5 parts by mass of toluene and kneaded at 105° C. using a pressurizing kneader and, after that, toluene and water were removed therefrom in vacuo to give a resin composition.

Example 3

20 parts by mass of methyl methacrylate-butadiene latex (NALSTER MR174 manufactured by Nippon A&L; degree of gelation: 95%; nonvolatile moiety: 50%) and 89 parts by mass of acrylonitrile-butadiene latex (CYATEX NA 20 manufactured by Nippon A&L; degree of gelation: 70%; nonvolatile moiety: 45%) as latex (A) components;

15 parts by mass of oligobutadiene acrylate (ABU-3 manufactured by Kyoeisha Kagaku; number-average molecular weight: ca. 2700), 4 parts by mass of lauryl methacrylate and parts by mass of trimethylolpropane triacrylate as photopolymerizable compounds (B);

1 part by mass of benzyl dimethylketal as a photopolymerization initiator (C) and others which were 20 parts by mass of PFT-3 (a compound of molecular weight of ca. 20,000 having a urethaneurea structure manufactured by Kyoeisha Kagaku; nonvolatile moiety: 25%) as a hydrophilic polymer, 0.1 part by mass of hydroquinone monomethyl ether as a polymerization inhibitor and 9 parts by mass of liquid butadiene rubber as a plasticizer were mixed in a container together with 5 parts by mass of toluene and kneaded at 105° C. using a pressurizing kneader and, after that, toluene and water were removed therefrom in vacuo to give a resin composition.

Example 4

20 parts by mass of methyl methacrylate-butadiene latex (NALSTER MR174 manufactured by Nippon A&L; degree of gelation: 95%; nonvolatile moiety: 50%) and 89 parts by mass of acrylonitrile-butadiene latex (CYATEX NA 20 manufactured by Nippon A&L; degree of gelation: 70%; nonvolatile moiety: 45%) as latex (A) components;

15 parts by mass of oligobutadiene acrylate (ABU-3 manufactured by Kyoeisha Kagaku; number-average molecular weight: ca. 2700), 10 parts by mass of lauryl methacrylate and parts by mass of pentaerythritol trimethacrylate as photopolymerizable compounds (B);

1 part by mass of benzyl dimethylketal as a photopolymerization initiator (C) and others which were 20 parts by mass of PFT-3 (a compound of molecular weight of ca. 20,000 having a urethaneurea structure manufactured by Kyoeisha Kagaku; nonvolatile moiety: 25%) as a hydrophilic polymer, 0.1 part by mass of hydroquinone monomethyl ether as a polymerization inhibitor and 9 parts by mass of liquid butadiene rubber as a plasticizer were mixed in a container together with 5 parts by mass of toluene and kneaded at 105° C. using a pressurizing kneader and, after that, toluene and water were removed therefrom in vacuo to give a resin composition.

Example 5

20 parts by mass of methyl methacrylate-butadiene latex (NALSTER MR174 manufactured by Nippon A&L; degree of gelation: 95%; nonvolatile moiety: 50%) and 89 parts by mass of acrylonitrile-butadiene latex (CYATEX NA 20 manufactured by Nippon A&L; degree of gelation: 70%; nonvolatile moiety: 45%) as latex (A) components;

20 parts by mass of oligobutadiene acrylate (ABU-3 manufactured by Kyoeisha Kagaku; number-average molecular weight: ca. 2700), 7.5 parts by mass of lauryl methacrylate and 7.5 parts by mass of trimethylolpropane triacrylate as photopolymerizable compounds (B);

1 part by mass of benzyl dimethylketal as a photopolymerization initiator (C) and others which were 20 parts by mass of PFT-3 (a compound of molecular weight of ca. 20,000 having a urethaneurea structure manufactured by Kyoeisha Kagaku; nonvolatile moiety: 25%) as a hydrophilic polymer, 0.1 part by mass of hydroquinone monomethyl ether as a polymerization inhibitor and 9 parts by mass of liquid butadiene rubber as a plasticizer were mixed in a container together with 5 parts by mass of toluene and kneaded at 105° C. using a pressurizing kneader and, after that, toluene and water were removed therefrom in vacuo to give a resin composition.

Example 6

25 parts by mass of methyl methacrylate-butadiene latex (NALSTER MR174 manufactured by Nippon A&L; degree of gelation: 95%; nonvolatile moiety: 50%) and 25 parts by mass of acrylonitrile-butadiene latex (SX 1503 manufactured by Nippon Zeon; degree of gelation: 0%; nonvolatile moiety: 42%) as latex (A) components;

15 parts by mass of oligobutadiene acrylate (ABU-3 manufactured by Kyoeisha Kagaku; number-average molecular weight: ca. 2700), 10 parts by mass of lauryl methacrylate and parts by mass of trimethylolpropane triacrylate as photopolymerizable compounds (B);

1 part by mass of benzyl dimethylketal as a photopolymerization initiator (C) and others which were 20 parts by mass of PFT-3 (a compound of molecular weight of ca. 20,000 having a urethaneurea structure manufactured by Kyoeisha Kagaku; nonvolatile moiety: 25%) as a hydrophilic polymer, 0.1 part by mass of hydroquinone monomethyl ether as a polymerization inhibitor and 9 parts by mass of liquid butadiene rubber as a plasticizer were mixed in a container together with 5 parts by mass of toluene and kneaded at 105° C. using a pressurizing kneader and, after that, toluene and water were removed therefrom in vacuo to give a resin composition.

Example 7

20 parts by mass of methyl methacrylate-butadiene latex (NALSTER MR174 manufactured by Nippon A&L; degree of gelation: 95%; nonvolatile moiety: 50%) and 89 parts by mass of acrylonitrile-butadiene latex (CYATEX NA 20 manufactured by Nippon A&L; degree of gelation: 70%; nonvolatile moiety: 45%) as latex (A) components;

15 parts by mass of oligobutadiene acrylate (ABU-3 manufactured by Kyoeisha Kagaku; number-average molecular weight: ca. 2700), 10 parts by mass of lauryl methacrylate and parts by mass of trimethylolpropane triacrylate as photopolymerizable compounds (B);

1 part by mass of benzyl dimethylketal as a photopolymerization initiator (C) and others which were 0.1 part by mass of hydroquinone monomethyl ether as a polymerization inhibitor and 9 parts by mass of liquid butadiene rubber as a plasticizer were mixed in a container together with 5 parts by mass of toluene and kneaded at 105° C. using a pressurizing kneader and, after that, toluene and water were removed therefrom in vacuo to give a resin composition.

Example 8

Hydroxyl group-containing polybutadiene (molecular weight: number-average molecular weight was 500; amount of hydroxyl group: 4.1 mol equivalents/kg) (900 parts by mass) and 260 parts by mass of acrylic acid were made to react at 70° C. for two hours in the presence of 900 parts by mass of cyclohexane and 5 parts by mass of toluenesulfonic acid and cyclohexane was evaporated therefrom to give oligobutadiene acrylate where number-average molecular weight was ca. 600.

Then, 20 parts by mass of methyl methacrylate-butadiene latex (NALSTER MR174 manufactured by Nippon A&L; degree of gelation: 95%; nonvolatile moiety: 50%) and 89 parts by mass of acrylonitrile-butadiene latex (CYATEX NA 20 manufactured by Nippon A&L; degree of gelation: 70%; nonvolatile moiety: 45%) as latex (A) components;

15 parts by mass of the above-mentioned oligobutadiene acrylate, 10 parts by mass of lauryl methacrylate and 10 parts by mass of trimethylolpropane triacrylate as photopolymerizable compounds (B);

1 part by mass of benzyl dimethylketal as a photopolymerization initiator (C) and others which were 20 parts by mass of PFT-3 (a compound of molecular weight of ca. 20,000 having a urethaneurea structure manufactured by Kyoeisha Kagaku; nonvolatile moiety: 25%) as a hydrophilic polymer, 0.1 part by mass of hydroquinone monomethyl ether as a polymerization inhibitor and 9 parts by mass of liquid butadiene rubber as a plasticizer were mixed in a container together with 5 parts by mass of toluene and kneaded at 105° C. using a pressurizing kneader and, after that, toluene and water were removed therefrom in vacuo to give a resin composition.

Example 9

Hydroxyl group-containing polybutadiene (molecular weight: number-average molecular weight was 7000; amount of hydroxyl group: 0.29 mol equivalents/kg) (900 parts by mass) and 19 parts by mass of acrylic acid were made to react at 70° C. for five hours in the presence of 900 parts by mass of cyclohexane and 5 parts by mass of toluenesulfonic acid and cyclohexane was evaporated therefrom to give oligobutadiene acrylate where number-average molecular weight was ca. 7100.

Then, 20 parts by mass of methyl methacrylate-butadiene latex (NALSTER MR174 manufactured by Nippon A&L; degree of gelation: 95%; nonvolatile moiety: 50%) and 89 parts by mass of acrylonitrile-butadiene latex (CYATEX NA 20 manufactured by Nippon A&L; degree of gelation: 70%; nonvolatile moiety: 45%) as latex (A) components;

15 parts by mass of the above-mentioned oligobutadiene acrylate, 10 parts by mass of lauryl methacrylate and 10 parts by mass of trimethylolpropane triacrylate as photopolymerizable compounds (B);

1 part by mass of benzyl dimethylketal as a photopolymerization initiator (C) and others which were 20 parts by mass of PFT-3 (a compound of molecular weight of ca. 20,000 having a urethaneurea structure manufactured by Kyoeisha Kagaku; nonvolatile moiety: 25%) as a hydrophilic polymer, 0.1 part by mass of hydroquinone monomethyl ether as a polymerization inhibitor and 9 parts by mass of liquid butadiene rubber as a plasticizer were mixed in a container together with 5 parts by mass of toluene and kneaded at 105° C. using a pressurizing kneader and, after that, toluene and water were removed therefrom in vacuo to give a resin composition.

Example 10

Hydroxyl group-containing polyisoprene (molecular weight: number-average molecular weight was 2,500; amount of hydroxyl group: 0.83 mol equivalent/kg; liquid polyisoprene Poly ip having terminal hydroxyl group manufactured by Idemitsu Kosan) (900 parts by mass) and 52 parts by mass of acrylic acid were made to react at 70° C. for five hours in the presence of 900 parts by mass of cyclohexane and 5 parts by mass of toluenesulfonic acid and cyclohexane was evaporated therefrom to give oligoisoprene acrylate where number-average molecular weight was ca. 2700.

Then, 20 parts by mass of methyl methacrylate-butadiene latex (NALSTER MR174 manufactured by Nippon A&L; degree of gelation: 95%; nonvolatile moiety: 50%) and 89 parts by mass of acrylonitrile-butadiene latex (CYATEX NA 20 manufactured by Nippon A&L; degree of gelation: 70%; nonvolatile moiety: 45%) as latex (A) components;

15 parts by mass of the above-mentioned oligoisoprene acrylate, 10 parts by mass of lauryl methacrylate and 10 parts by mass of trimethylolpropane triacrylate as photopolymerizable compounds (B);

1 part by mass of benzyl dimethylketal as a photopolymerization initiator (C) and others which were 20 parts by mass of PFT-3 (a compound of molecular weight of ca. 20,000 having a urethaneurea structure manufactured by Kyoeisha Kagaku; nonvolatile moiety: 25%) as a hydrophilic polymer, 0.1 part by mass of hydroquinone monomethyl ether as a polymerization inhibitor and 9 parts by mass of liquid butadiene rubber as a plasticizer were mixed in a container together with 5 parts by mass of toluene and kneaded at 105° C. using a pressurizing kneader and, after that, toluene and water were removed therefrom in vacuo to give a resin composition.

Comparative Example 1

20 parts by mass of methyl methacrylate-butadiene latex (NALSTER MR174 manufactured by Nippon A&L; degree of gelation: 95%; nonvolatile moiety: 50%) and 89 parts by mass of acrylonitrile-butadiene latex (CYATEX NA 20 manufactured by Nippon A&L; degree of gelation: 70%; nonvolatile moiety: 45%) as latex (A) components;

15 parts by mass of oligobutadiene acrylate (ABU-3 manufactured by Kyoeisha Kagaku; number-average molecular weight: ca. 2700), 15.2 parts by mass of lauryl methacrylate and 4.8 parts by mass of trimethylolpropane triacrylate as photopolymerizable compounds (B);

1 part by mass of benzyl dimethylketal as a photopolymerization initiator (C) and others which were 20 parts by mass of PFT-3 (a compound of molecular weight of ca. 20,000 having a urethaneurea structure manufactured by Kyoeisha Kagaku; nonvolatile moiety: 25%) as a hydrophilic polymer, 0.1 part by mass of hydroquinone monomethyl ether as a polymerization inhibitor and 9 parts by mass of liquid butadiene rubber as a plasticizer were mixed in a container together with 5 parts by mass of toluene and kneaded at 105° C. using a pressurizing kneader and, after that, toluene and water were removed therefrom in vacuo to give a resin composition.

Comparative Example 2

20 parts by mass of methyl methacrylate-butadiene latex (NALSTER MR174 manufactured by Nippon A&L; degree of gelation: 95%; nonvolatile moiety: 50%) and 89 parts by mass of acrylonitrile-butadiene latex (CYATEX NA 20 manufactured by Nippon A&L; degree of gelation: 70%; nonvolatile moiety: 45%) as latex (A) components;

15 parts by mass of oligobutadiene acrylate (ABU-3 manufactured by Kyoeisha Kagaku; number-average molecular weight: ca. 2700), 0.8 parts by mass of lauryl methacrylate and 19.2 parts by mass of trimethylolpropane triacrylate as photopolymerizable compounds (B);

1 part by mass of benzyl dimethylketal as a photopolymerization initiator (C) and others which were 20 parts by mass of PFT-3 (a compound of molecular weight of ca. 20,000 having a urethaneurea structure manufactured by Kyoeisha Kagaku; nonvolatile moiety: 25%) as a hydrophilic polymer, 0.1 part by mass of hydroquinone monomethyl ether as a polymerization inhibitor and 9 parts by mass of liquid butadiene rubber as a plasticizer were mixed in a container together with 5 parts by mass of toluene and kneaded at 105° C. using a pressurizing kneader and, after that, toluene and water were removed therefrom in vacuo to give a resin composition.

Comparative Example 3

20 parts by mass of methyl methacrylate-butadiene latex (NALSTER MR174 manufactured by Nippon A&L; degree of gelation: 95%; nonvolatile moiety: 50%) and 89 parts by mass of acrylonitrile-butadiene latex (CYATEX NA 20 manufactured by Nippon A&L; degree of gelation: 70%; nonvolatile moiety: 45%) as latex (A) components;

30 parts by mass of oligobutadiene acrylate (ABU-3 manufactured by Kyoeisha Kagaku; number-average molecular weight: ca. 2700) and 5 parts by mass of lauryl methacrylate as photopolymerizable compounds (B);

1 part by mass of benzyl dimethylketal as a photopolymerization initiator (C) and others which were 20 parts by mass of PFT-3 (a compound of molecular weight of ca. 20,000 having a urethaneurea structure manufactured by Kyoeisha Kagaku; nonvolatile moiety: 25%) as a hydrophilic polymer, 0.1 part by mass of hydroquinone monomethyl ether as a polymerization inhibitor and 9 parts by mass of liquid butadiene rubber as a plasticizer were mixed in a container together with 5 parts by mass of toluene and kneaded at 105° C. using a pressurizing kneader and, after that, toluene and water were removed therefrom in vacuo to give a resin composition.

Comparative Example 4

20 parts by mass of methyl methacrylate-butadiene latex (NALSTER MR174 manufactured by Nippon A&L; degree of gelation: 956; nonvolatile moiety: 50%) and 89 parts by mass of acrylonitrile-butadiene latex (CYATEX NA 20 manufactured by Nippon A&L; degree of gelation: 70%; nonvolatile moiety: 45%) as latex (A) components;

5 parts by mass of oligobutadiene acrylate (ABU-3 manufactured by Kyoeisha Kagaku; number-average molecular weight: ca. 2700) and 30 parts by mass of trimethylolpropane triacrylate as photopolymerizable compounds (B);

1 part by mass of benzyl dimethylketal as a photopolymerization initiator (C) and others which were 20 parts by mass of PFT-3 (a compound of molecular weight of ca. 20,000 having a urethaneurea structure manufactured by Kyoeisha Kagaku; nonvolatile moiety: 25%) as a hydrophilic polymer, 0.1 part by mass of hydroquinone monomethyl ether as a polymerization inhibitor and 9 parts by mass of liquid butadiene rubber as a plasticizer were mixed in a container together with 5 parts by mass of toluene and kneaded at 105° C. using a pressurizing kneader and, after that, toluene and water were removed therefrom in vacuo to give a resin composition.

Comparative Example 5

119 parts by mass of acrylonitrile-butadiene latex (SX 1503 manufactured by Nippon Zeon; degree of gelation: 0%; nonvolatile moiety: 42%) as a latex (A) component;

15 parts by mass of oligobutadiene acrylate (ABU-3 manufactured by Kyoeisha Kagaku; number-average molecular weight: ca. 2700), 10 parts by mass of lauryl methacrylate and parts by mass of trimethylolpropane triacrylate as photopolymerizable compounds (B);

1 part by mass of benzyl dimethylketal as a photopolymerization initiator (C) and others which were 20 parts by mass of PFT-3 (a compound of molecular weight of ca. 20,000 having a urethaneurea structure manufactured by Kyoeisha Kagaku; nonvolatile moiety: 25%) as a hydrophilic polymer, 0.1 part by mass of hydroquinone monomethyl ether as a polymerization inhibitor and 9 parts by mass of liquid butadiene rubber as a plasticizer were mixed in a container together with 5 parts by mass of toluene and kneaded at 105° C. using a pressurizing kneader and, after that, toluene and water were removed therefrom in vacuo to give a resin composition.

Comparative Example 6

20 parts by mass of butadiene rubber (BR01 manufactured by Japan Synthetic Rubber Co. Ltd.; degree of gelation: 0%; nonvolatile moiety: 100%) and 30 parts by mass of acrylonitrile-butadiene rubber (N220SH manufactured by Japan Synthetic Rubber Co. Ltd.; degree of gelation: 0%; nonvolatile moiety: 100%) instead of latex (A);

15 parts by mass of oligobutadiene acrylate (ABU-3 manufactured by Kyoeisha Kagaku; number-average molecular weight: ca. 2700), 10 parts by mass of lauryl methacrylate and 10 parts by mass of trimethylolpropane triacrylate as photopolymerizable compounds (B);

1 part by mass of benzyl dimethylketal as a photopolymerization initiator (C) and others which were 20 parts by mass of PFT-3 (a compound of molecular weight of ca. 20,000 having a urethaneurea structure manufactured by Kyoeisha Kagaku; nonvolatile moiety: 25%) as a hydrophilic polymer, 0.1 part by mass of hydroquinone monomethyl ether as a polymerization inhibitor and 9 parts by mass of liquid butadiene rubber as a plasticizer were mixed in a container together with 5 parts by mass of toluene and kneaded at 105° C. using a pressurizing kneader and, after that, toluene and water were removed therefrom in vacuo to give a resin composition.

Then, the resin compositions obtained in Examples 1 to 10 and Comparative Examples 1 to 6 were sandwiched between a film composed of a polyethylene terephthalate film having a thickness of 125 μm coated with a polyester-based adhesive layer and a film composed of a polyethylene terephthalate film the same as the foregoing one coated with an anti-adhesive layer (polyvinyl alcohol) so that the adhesive layer and the anti-adhesive layer could come into contact with the resin composition, and then pressed with a heat pressing machine at 105° C. for 1 minute at a pressure of 100 kg/cm$^2$, thereby obtaining a sheet-like molded material having a thickness of 1.7 mm. Subsequently, both sides of this sheet-like molded material were exposed to light for ten minutes using an UV exposure machine (light source: 10R manufactured by Koninklijke Philips Electronics) of 8 mW/cm$^2$ from the height of 5 cm above its surface to photocure, thereby producing a printing original plate.

The printing original plates of Examples 1 to 10 and Comparative Examples 1 to 6, which were produced by the above technique, were wound with a double-sided tape on a plate-mounting drum of a laser engraving device, followed by laser engraving under the conditions shown below. A dust collector located near a laser gun was operated simultaneously with the start of the laser engraving, thereby discharging the engraved residues out of the device continuously. After the laser engraving, the plates were dismounted from the mounting drum and were washed with water for 3 minutes using a washer for water-developable plates (CRS600, manufactured by Toyobo Co., Ltd.; the developer was a 1% aqueous laundry soap solution; the water temperature was 40° C.) to remove a small amount of residues on the surface of the plates. The plates were then dried to obtain printing plates.

The laser engraving device used was a FlexPose! direct equipped with a 300 W carbon dioxide laser, manufactured by Luescher Flexo. The specifications of the device included a laser wavelength of 10.6 μm, a beam diameter of 30 μm, a plate-mounting drum diameter of 300 mm and a processing rate of 1.5 hours/0.5 m$^2$. The conditions of the laser engraving are as follows. Here, (1) to (3) are conditions inherent to the device. For conditions (4) to (7), which may be set arbitrarily, standard conditions of the device were adopted, respectively.

(1) Resolution: 2540 dpi
(2) Laser pitch: 10 μm
(3) The number of drum rotations: 982 cm/sec.
(4) Top power: 9%
(5) Bottom power: 100%
(6) Shoulder width: 0.30 mm
(7) Relief depth: 0.60 mm
(8) Evaluated image: 175 lpi, screen dots at every 1% from 0 to 100%

The printing plates obtained were investigated for the following evaluation items. Table 1 shows the result of these performance evaluations.
(1) Condition of Residue Adhesion Using a microscope of 100 magnifications, the condition of residue adhesion to the surface of a printing plate was inspected visually and was expressed in the following four levels.

oo: almost no residue was found; o: a little residue was found; Δ: a considerable amount of residue was found; x: a great amount of residue was found.
(2) Screen Dot Shape A 10% screen dot shape at 175 lpi was observed under a microscope of 100 magnifications.

o: the screen dot shape was reproduced as cones having neither partial breakage nor unlevel defect Δ: the screen dot shape had partial breakage and unlevel defect and was partially unclear x: the screen dot shape had many partial breakages and unlevel defects and was unclear (3) Screen Dot-Forming Property Minimum screen dot-forming property at 150 lpi and the minimum screen dot-forming property at 175 lpi were measured using a microscope of 100 magnifications.

(4) Ink Transfer

Printing was carried out using a flexographic printer and the ink transfer on the surface of the printing plate was observed under a microscope of 100 magnifications.

o: no faded print was noted
Δ: some faded prints were noted
x: faded prints were noted (5) Printing Durability Printing was carried out using a flexographic printer and, after finishing each 1000 printings, the relief was observed under a loupe of 30 magnifications and the numbers of printed copies which were printed before generation of cracking on the relief were defined as the printable copy numbers.

o: printable copy numbers were 1,000,000 or more
Δ: printable copy numbers were 100,000 or more and less than 1,000,000
x: printable copy numbers were less than 100,000 and the ethylenic unsaturated monomer comprised 75 to 5% by weight of monofunctional monomer and 25 to 95% by weight of trifunctional monomer, there were prepared printing plates having good laser engraving property and good ink transfer and printing durability were also good. On the contrary, in Comparative Example 1 where the monofunctional monomer was too much, although ink transfer and printing durability were good, laser engraving property was poor while, in Comparative Example 2 where the trifunctional monomer was too much, although laser engraving property was good, ink transfer and printing durability were poor. In Comparative Example 3 where the photopolymerizable oligomer was too much, although ink transfer and printing durability were good, laser engraving property was poor while, in Comparative Example 4 where the ethylenic unsaturated monomer was too much, although laser engraving property was good, ink transfer and printing durability were poor. In Comparative Example 5 where the weight-average degree of gelation of the latex was 0% and in Comparative Example 6 where rubber was used instead of latex, although ink transfer and printing durability were good, laser engraving property

TABLE 1

| | | | Examples | | | | | | | | | | Comparative Examples | | | | | |
|---|---|---|---|---|---|---|---|---|---|---|---|---|---|---|---|---|---|---|
| | | | 1 | 2 | 3 | 4 | 5 | 6 | 7 | 8 | 9 | 10 | 1 | 2 | 3 | 4 | 5 | 6 |
| Composition of photosensitive resin (% by weight) | (A) Latex | MBR latex | 10 | 10 | 10 | 10 | 10 | 25 | 10.5 | 10 | 10 | 10 | 10 | 10 | 10 | 10 | | |
| | | NBR latex (A) | 40 | 40 | 40 | 40 | 40 | | 42.1 | 40 | 40 | 40 | 40 | 40 | 40 | 40 | | |
| | | NBR latex (B) | | | | | | 25 | | | | | | | | | 50 | |
| | | Butadiene rubber | | | | | | | | | | | | | | | | 20 |
| | | Nitrile-butadiene rubber | | | | | | | | | | | | | | | | 30 |
| | | Weight-average degree of gelation of latex (%) | 75 | 75 | 75 | 75 | 75 | 52 | 75 | 75 | 75 | 75 | 75 | 75 | 75 | 75 | 0 | — |
| | | Hydrophilic polymer (PFT-3: nonvolatile moiety 25% by weight) | 5 | 5 | 5 | 5 | 5 | 5 | 0 | 5 | 5 | 5 | 5 | 5 | 5 | 5 | 5 | 5 |
| | (B) Photopolymerizable compounds | Oligobutadiene acrylate: molecular weight of ca. 2700 | 15 | 15 | 15 | 15 | 20 | 15 | 15.8 | | | | 15 | 15 | 30 | 5 | 15 | 15 |
| | | Oligobutadiene acrylate: molecular weight of ca. 600 | | | | | | | | 15 | | | | | | | | |
| | | Oligobutadiene acrylate: molecular weight of ca. 7100 | | | | | | | | | 15 | | | | | | | |
| | | Oligoisoprene acrylate: molecular weight of ca. 2700 | | | | | | | | | | 15 | | | | | | |
| | | Lauryl methacrylate | 10 | 7 | 4 | 10 | 7.5 | 10 | 10.5 | 10 | 10 | 10 | 15.2 | 0.8 | 5 | | 10 | 10 |
| | | Trimethylolpropane triacrylate | 10 | 13 | 16 | | 7.5 | 10 | 10.5 | 10 | 10 | 10 | 4.8 | 19.2 | | 30 | 10 | 10 |
| | | Pentaerythritol trimethacrylate | | | | 10 | | | | | | | | | | | | |
| | (C) Photopolymerization initiator | Benzyl dimethylketal | 1 | 1 | 1 | 1 | 1 | 1 | 1 | 1 | 1 | 1 | 1 | 1 | 1 | 1 | 1 | 1 |
| Laser engraving property | | Condition of residue adhesion | oo | oo | oo | oo | o | o | o | o | o | o | Δ | oo | Δ | oo | x | x |
| | | Screen dot shape | o | o | o | o | o | o | o | o | o | o | Δ | o | x | o | x | x |
| | | 150 lpi, Screen dot-forming property | 1% | 1% | 1% | 1% | 1% | 1% | 1% | 1% | 2% | 1% | 1% | 1% | 1% | 1% | 5% | 5% |
| | | 175 lpi, Screen dot-forming property | 1% | 1% | 1% | 1% | 1% | 1% | 1% | 1% | 2% | 1% | 2% | 1% | 2% | 1% | 7% | 7% |
| Printing property | | Ink transfer | o | o | Δ | o | o | o | Δ | o | o | o | x | o | x | o | o |
| | | Printing durability | o | o | Δ | o | o | o | o | Δ | o | o | x | o | x | o | o |

It is understood from the evaluated results of Table 1 that, in Examples 1 to 10 in which latex where weight-average degree of gelation was 40% or more was used, photopolymerizable oligomer and ethylenic unsaturated monomer were used in 10 to 25% by weight and 5 to 40% by weight, respectively, to the weight of the photosensitive resin composition was poor. From those results, it is noted that, when the printing original plate of the present invention is used, generation, adhesion and growth of the residues caused by laser irradiation were able to be effectively suppressed whereupon no printing deficiency was resulted and, in addition, resolution is good. It is also noted that, when the printing original plate of the present invention is used, printing property (ink transfer and printing durability) is very good as well.

INDUSTRIAL APPLICABILITY

In the flexographic plate of the present invention capable of being laser-engraved, it is very rare that the residues generated by laser irradiation upon preparing the printing plate remain by adhering onto the surface of the plate. Accordingly, it is able to be advantageously used as a printing original plate for laser engraving particularly in the field of flexography when printing plate requiring high resolution and printing property is prepared.

What is claimed is:

1. A flexographic printing original plate capable of being laser-engraved which is obtained by subjecting a photosensitive resin composition containing (A) at least one latex having a weight-average degree of gelation of 40% or more, (B) a photopolymerizable component and (C) a photopolymerization initiator to irradiation to light followed by cross-linking and curing, wherein the photopolymerizable component (B) contains a photopolymerizable oligomer and at least one ethylenic unsaturated monomer in 10 to 25% by weight and 5 to 40% by weight respectively, to the weight of the photosensitive resin composition and the at least one ethylenic unsaturated monomer comprises 75 to 5% by weight of a monofunctional monomer and 25 to 95% by weight of a trifunctional monomer.

2. The flexographic printing original plate according to claim 1, wherein the photopolymerizable oligomer has the same skeleton structure as the latex (A) and has a number-average molecular weight of 500 to 8000.

3. The flexographic printing original plate of claim 1, wherein the trifunctional monomer is trimethylolpropane triacrylate, trimethylolpropane trimethacrylate, pentaerythritol triacrylate, pentaerythritol trimethacrylate, glycerol triacrylate, glycerol trimethacrylate, triglycidyl ether triacrylate, or triglycidyl ether trimethacrylate.

4. The flexographic printing original plate of claim 1, wherein the at least one ethylenic unsaturated monomer comprises 40 to 90% by weight of the trifunctional monomer.

5. The flexographic printing original plate of claim 1, wherein the monofunctional monomer is an alkyl (meth)acrylate, a cycloalkyl (meth)acrylate, a haloalkyl (meth)acrylate, an alkoxyalkyl (meth)acrylate, a phenoxyalkyl (meth)acrylate, an alkoxyalkylene glycol (meth)acrylate.

6. The flexographic printing original plate of claim 1, wherein the monofunctional monomer is methyl acrylate, methyl methacrylate, ethyl acrylate, ethyl methacrylate, propyl acrylate, propyl methacrylate, butyl acrylate, butyl methacrylate, isoamyl acrylate, isoamyl methacrylate, 2-ethylhexyl acrylate, 2-ethylhexyl methacrylate, lauryl acrylate, lauryl methacrylate, stearyl acrylate, stearyl methacrylate, cyclohexyl acrylate, cyclohexyl methacrylate, chloroethyl acrylate, chloroethyl methacrylate, chloropropyl acrylate, chloropropyl methacrylate, methoxyethyl acrylate, methoxyethyl methacrylate, ethoxyethyl acrylate, ethoxyethyl methacrylate, butoxyethyl acrylate, butoxyethyl methacrylate, phenoxyethyl acrylate, nonylphenoxyethyl acrylate, nonylphenoxyethyl methacrylate, ethoxydiethylene glycol acrylate, ethoxydiethylene glycol methacrylate, methoxytriethylene glycol acrylate, methoxytriethylene glycol methacrylate, methoxydipropylene glycol acrylate, methoxydipropylene glycol methacrylate.

7. The flexographic printing original plate of claim 1, wherein the at least one ethylenic unsaturated monomer comprises 60 to 10% by weight of the monofunctional monomer.

* * * * *